United States Patent

[11] 3,542,456

| [72] | Inventor | Roger W. Huge |
| | | 8576 Fair Road, Strongsville, Ohio 44136 |
| [21] | Appl. No. | 719,651 |
| [22] | Filed | April 8, 1968 |
| [45] | Patented | Nov. 24, 1970 |

[54] AUXILIARY REAR VIEW MIRRORS FOR AUTOMOBILES AND THE LIKE
1 Claim, 4 Drawing Figs.

[52] U.S. Cl. ........................................................ 350/307, 248/476
[51] Int. Cl. ........................................................ G02b 5/08
[50] Field of Search ............................................ 248/466–468, 475, 479, 476, 481; 350/288, 301–303, 307

[56] References Cited
UNITED STATES PATENTS
2,241,866  5/1941  Needham .................... 350/307
2,999,427  9/1961  Newcomb .................... 350/307
3,433,448  3/1969  Weber ......................... 248/476

Primary Examiner—David Schonberg
Assistant Examiner—Michael J. Tokar
Attorney—McNenny, Farrington, Pearne & Gordon ABSTRACT: An auxiliary rearview mirror structure for temporary use on an automobile when towing a trailer or other conveyance. A mirror is adjustably mounted on each end of a tubular frame member which extends laterally across the hood of the automobile. The tubular member is arched to insure clearance over a crown in the hood and is fastened to each side of the hood by two suction cups and by a strap which extends between the hood and the fender and under the hood to attach to a structural member of the hood. Since the auxiliary mirror structure is supported entirely by the hood, it permits the hood to be raised and lowered with it mounted thereon.

Patented Nov. 24, 1970
3,542,456
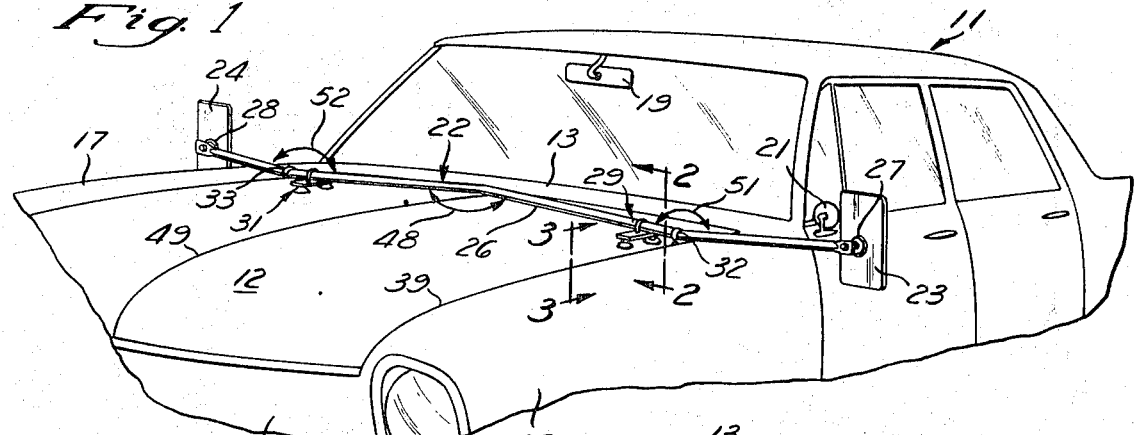
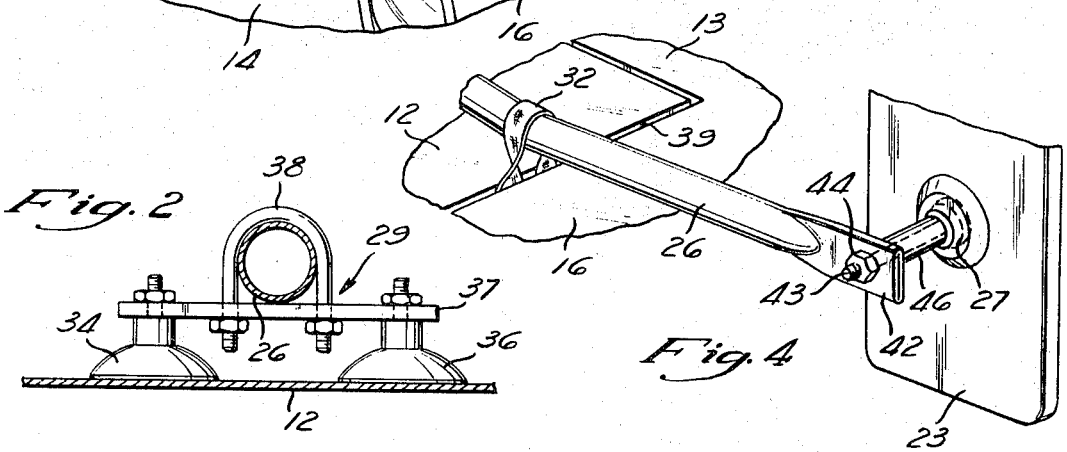
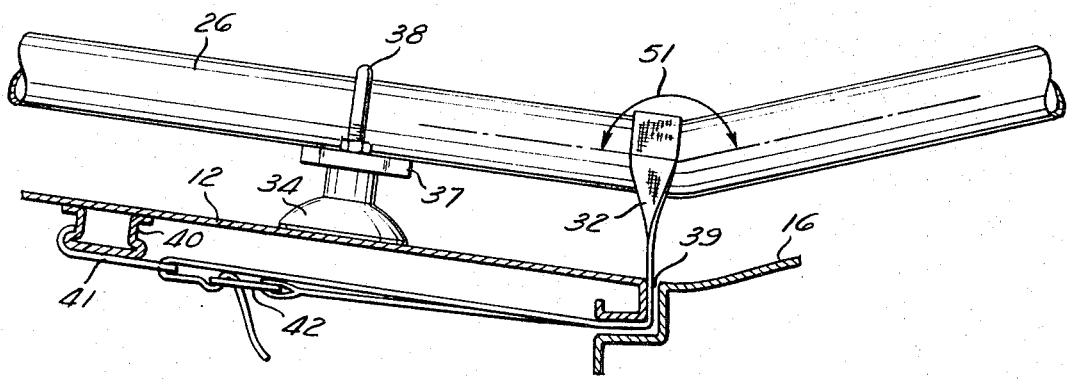
INVENTOR.
ROGER W. HUGE
BY
McNENNY, FARRINGTON, PEARNE & GORDON
ATTORNEYS 3,542,456

1

AUXILIARY REAR VIEW MIRRORS FOR AUTOMOBILES AND THE LIKE

BACKGROUND OF THE INVENTION

This invention relates generally to auxiliary rearview mirrors for motor vehicles and more particularly to a novel and improved easily installed auxiliary rear view mirror structure for temporary use on automobiles and trucks when towing trailers and other conveyances.

When an automobile or other motor vehicle is employed to pull a trailer or other conveyance on the highways, the driver's rearward visibility normally provided by the standard permanently mounted inside and outside rear view mirrors on the automobile is often obstructed. Although the danger attendant with driving an automobile on modern highways and freeways without knowledge of the traffic conditions to the rear of the vehicle is known to every driver, few motorists are willing to spend any substantial amount of time or money to provide their automobiles with adequate means for rearward visibility when towing conveyances, especially when the automobile is used rather infrequently for this purpose.

The prior art in this field reveals a wide variety of auxiliary rearview mirror structures. Although these prior art structures may perform their intended functions, they are often so complex and cumbersome as to be both expensive and time consuming to install and remove. Furthermore, they may not be readily adapted for use on a wide variety of automobiles without any modifications. One such prior art structure is disclosed in U.S. Letters Pat. No. 2,999,427 to Newcomb. It is readily apparent that such structures do not serve to encourage the use of auxiliary rear view mirrors but instead have a negative effect due to their complexity and expense, the excessive time required for installation and removal, and the fact that they are not universally adapted for use on any automobile.

SUMMARY OF THE INVENTION

The present invention overcomes these and other attendant difficulties of the prior art structures by providing a simple, inexpensive and easily installed auxiliary rearview mirror structure for temporary use on substantially any automobile or small truck when towing a trailer or other conveyance. The invention provides a structure that is of such simplicity and low cost that even the occasional user can afford to own one, and it is easy enough to install and remove that motorists will be encouraged to use it even when traveling small distances so that safety on the highways will be enhanced.

The invention provides two mirrors adjustably mounted on the extremities of an elongated frame member which extends laterally across the hood of the vehicle. The frame member is fastened to each side of the hood by suction cups and by a strap which reaches under the hood and attaches to a structural member of the hood. The elongated frame member is arched to insure clearance over any crown or lands in the hood of the vehicle, and the suction cups are movable along the frame member so that they may be positioned near the edges of the hood to provide the structure with a maximum of rigidity.

It is an important object of this invention to provide a novel and improved auxiliary rear view mirror structure for use on motor vehicles when towing a trailer or other conveyance which is simple and rugged in construction, low in cost, and easily installed and removed in order to encourage the use of such structures and promote greater safety on the highways.

It is another object of this invention to provide a novel and improved auxiliary rearview mirror structure for motor vehicles according to the preceding object which is adapted for use on nearly all automobiles and small trucks.

DESCRIPTION OF THE PREFERRED EMBODIMENT

These and other objects and advantages of the invention will appear from the following description and drawings wherein:

2

FIG. 1 is a perspective fragmentary view of an automobile with a mirror structure incorporating the present invention mounted thereon;

FIG. 2 is an enlarged sectional view, the plane of the section being indicated by line 2—2 in FIG. 1;

FIG. 3 is an enlarged fragmentary sectional view, the plane of the section being indicated by line 3—3 in FIG. 1; and FIG. 4 is an enlarged perspective fragmentary view 1 the structure by which a mirror in FIG. 1 is secured to the supporting frame.

Referring now to the FIGS. in greater detail, reference numeral 11 designates generally an automobile having a hood 12 extending longitudinally from the cowl 13 forward to the front portion 14 of the automobile, a left front fender 16, and a right front fender 17. An inside rearview mirror 19 and an outside rearview mirror 21 are permanently affixed to the automobile to provide the driver with rearward visibility under ordinary driving conditions. However, when the automobile is used to tow a trailer or other conveyance, the rearward visibility from these mirrors may be partially or completely blocked, and it is then necessary to provide other mirrors to furnish the driver with adequate rearward visibility. For this purpose, and auxiliary rearview mirror structure 22 is temporarily mounted on the hood of the car.

The auxiliary rearview mirror structure 22 includes a left rear view side mirror 23 and a right rearview side mirror 24 adjustably mounted on the extremities of an elongated frame member 26 by the left and right ball and socket mountings 27 and 28 respectively. The frame member 26 extends laterally across the hood 12 of the automobile and is of sufficient length to space the mirrors 23 and 24 a distance at least as great as the width of the trailer. The elongated frame member 26 may be fabricated from any one of numerous materials, but it has been found that three fourths inch thin wall tubing is well suited for this purpose due to its light weight and structural rigidity. The member 26 is fastened to the hood 12 by a left support assembly 29 and by a similar right support assembly 31 positioned near the left and right edges of the hood respectively and by left and right straps 32 and 33.

Referring now particularly to FIGS. 2 and 3, the left support assembly 29, which is identical to the right support assembly 31, is provided with front and rear suction cups 34 and 36 mounted on the ends of a support plate 37. The use of the two suction cups 34 and 36 mounted forward and rearward respectively of the frame member 26, in conjunction with the low profile of the assembly, i.e. the relatively small distance between the support plate 37 and the hood 12, provides the structure with a maximum of longitudinal stability. A U-bolt 38 is provided to fasten the tubular member 26 to the support plate 37. By loosening the U-bolt 38, the support assembly 29 may be moved along the frame member 26 so that it can be properly positioned near the left edge of the hood 12 regardless of the width of the hood. This provides the structure with a maximum of lateral stability. Although the auxiliary mirror structure 22 is most often mounted near the cowl 13, it may be longitudinally positioned on the hood anyplace between the cowl 13 and the front portion 14 to provide the driver with an unobstructed view of both mirrors 23 and 24. After the structure 22 has been secured to the hood 12 in the proper location by the suction cups of support assemblies 29 and 31, the hood 12 may be opened to secure the straps 32 and 33 in place.

The strap 32, which is identical to strap 33, is looped around the tubular member 26, passed through the longitudinal joint 39 between the hood 12 and the fender 16, and fastened to a hood reinforcing member 40 by a metal hook 41. The strap 32 is of relatively thin and flexible material and is provided with a forward reach and a rearward reach spaced longitudinally along the joint 39 so that the strap passes through the joint 39 in a single thickness and will not be cut or otherwise damaged when the clearance between the hood and the fender is relatively small. The strap 32 as shown in the preferred embodiment is formed of woven material provided with a thin rubber or plastic coating to minimize damage to the paint on the hood and fender at the joint 39. Furthermore, the strap 32 may be entirely of elastomeric material to provide a resilient force to hold the structure in position. The strap 32 is provided with a buckle 42 to provide adjustment of the effective length of the strap. Once the proper strap length has been determined, it need not be changed so long as the mirror structure is used on the same or similar automobile, particularly if the strap provides some elasticity.

The left end of the tubular member 26, which is similar to the right end, is provided with a flattened end portion 42 having a hold therethrough to accept the threaded stud 43 extending from the ball and socket mounting 27. The stud 43 then cooperates with the nut 44 and with the tubular member 46 to fasten the mirror 23 to the frame member 26. The frame member 26 is formed with an angle 48 substantially at its center to insure clearance of the frame member 26 over a crown 49 in the hood 12 of the automobile. The tubular member 26 is also formed with left and right side angles 51 and 52. These side angles are smaller than the center angle 48 and are located near the left and right support assemblies 29 and 31 respectively to raise the mirrors 23 and 24 to a position of optimum visibility for the driver. A center angle 48 of approximately 165° and side angles 51 and 52 of approximately 160° each have been found to be well suited for most automobiles and drivers.

If desired, the frame member 26 may be separated near its center into two pieces held together by a suitable connection such as a threaded pipe nipple or the like so that the structure can be collapsed for easy storage. Furthermore, although this auxiliary rearview mirror system has been shown mounted on an automobile, it may, of course, also be used on trucks or any other motor vehicle having a similar hood configuration. The auxiliary rearview mirror structure provided by the present invention is readily adapted for use on nearly any motor vehicle having a longitudinally extending hood. It requires absolutely no modifications to the vehicle itself, does not interfere with the operation of the hood, doors, or windows, and may be transferred from one vehicle to another very quickly and without damage to the vehicles. This makes the structure ideal for use by businesses engaged in renting trailers as well as by the individuals. The structure is of such simple construction that it can be sold for a very nominal price.

Although a preferred embodiment of this invention is illustrated, it is to be understood that various modifications and rearrangements of parts may be resorted to without departing from the scope of the invention disclosed and claimed herein.

I claim:

1. On a motor vehicle, an auxiliary rearview mirror structure comprising an elongated frame member, a first mirror adjustably mounted on one end of said frame member, a second mirror adjustably mounted on the other end of said frame member, a first support means positioned inwardly of said first mirror on said frame member securing said frame member to one side of a longitudinally extending hood of said motor vehicle, and a second support means located inwardly of said second mirror on said frame member securing said frame member to the other side of said hood of said motor vehicle, each of said support means including a first mounting means and a second mounting means; said first mounting means including a longitudinally extending plate secured to said frame member, a first suction cup carried by said plate and spaced longitudinally forwardly of said frame member, a second suction cup carried by said plate and spaced longitudinally rearward of said frame member; and said second mounting means including a flexible strap extending through a longitudinal joint formed between a longitudinal edge of said hood and a fender substantially adjacent thereto to the underside of said hood, a hook member detachably hooked to a hood support member on the underside of said hood, said hook member securing said strap under tension to said hood support member on the underside of said hood, and said flexible strap extending substantially vertically downwardly from said frame member to said longitudinal joint so that substantially the entire tension force of said flexible strap urges said suction cups downwardly against said hood.